E. H. HEBERN.
DIRECTION PREINDICATOR.
APPLICATION FILED NOV. 21, 1917.
1,346,453.
Patented July 13, 1920.
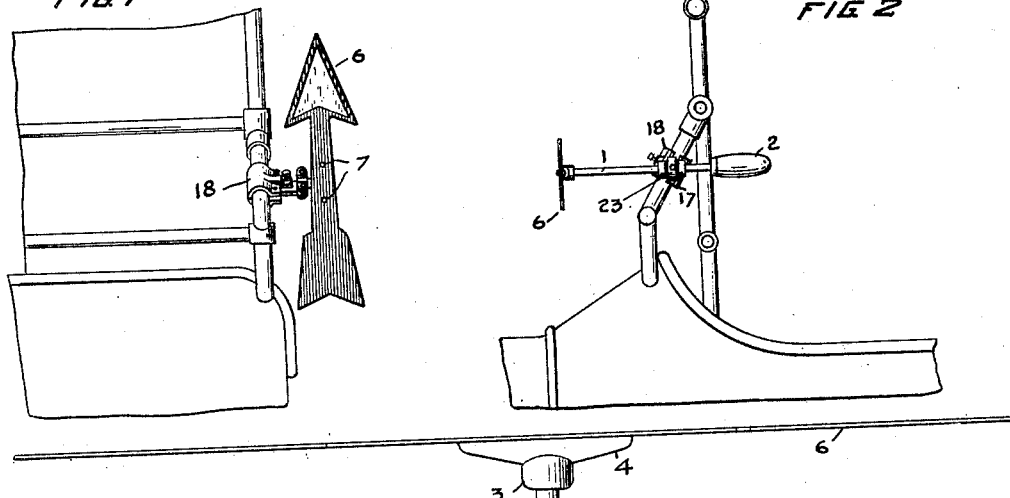
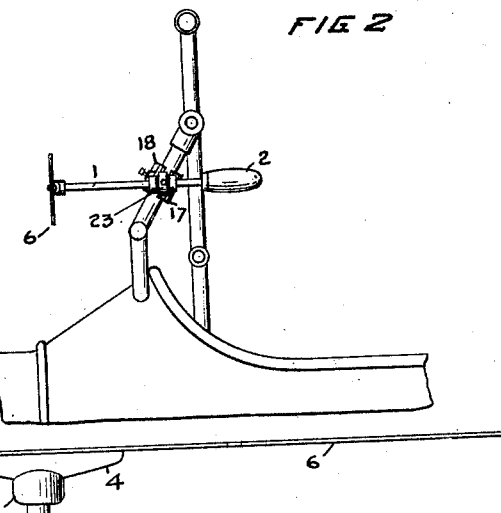
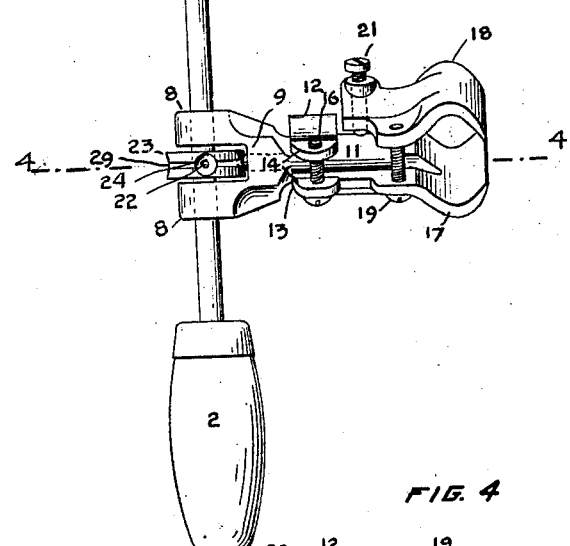
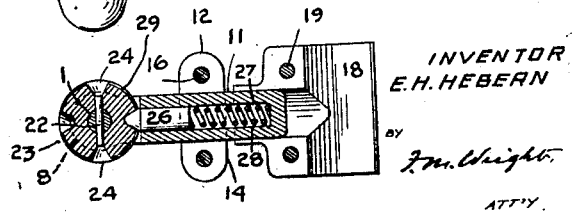
INVENTOR
E. H. HEBERN
BY
J. M. Wright
ATT'Y.

UNITED STATES PATENT OFFICE.

EDWARD H. HEBERN, OF OAKLAND, CALIFORNIA, ASSIGNOR TO H & H PATENT DEVELOPING COMPANY, OF OAKLAND, CALIFORNIA.

DIRECTION-PREINDICATOR.

1,346,453.   Specification of Letters Patent.   Patented July 13, 1920.

Application filed November 21, 1917. Serial No. 203,145.

*To all whom it may concern:*

Be it known that I, EDWARD H. HEBERN, a citizen of the United States, residing at Oakland, in the county of Alameda and State of California, have invented new and useful Improvements in Direction-Preindicators, of which the following is a specification.

The present invention relates to devices for indicating the direction in which the driver of a vehicle is about to steer the vehicle.

Many devices have heretofore been contrived for the above purpose, which have not recommended themselves to owners of automobiles and other vehicles, for the reason that they are difficult to adjust to various styles of automobiles, or are too expensive to be introduced, or require changes to be made in the frame of the automobile for the purpose of installing them thereon.

One object of the present invention then is to provide a device of this character which can be easily installed upon any automobile.
A second object is to provide one which will contain very few, and those very simple, parts.

A third object is to provide one which can be operated very easily and without any possibility of mistake.

In the accompanying drawing, Figure 1 is a broken front view of an automobile showing my direction-indicator applied thereto; Fig. 2 is a side view of the same, the indicator being shown in position different from that in Fig. 1; Fig. 3 is an enlarged plan view thereof; Fig. 4 is a cross section on the line 4—4 of Fig. 3.

Referring to the drawing, 1 indicates a stem having secured on its rear end a handle 2. The front end of said stem is driven very tightly into a recessed boss 3 of an elongated support 4, having a flat front surface against which can fit either side of an indicating arrow 6 made of sheet metal. Said arrow is secured to said support by means of screws 7 passing through holes in the arrow and screwed into threaded holes in the ends of the elongated support, thus enabling it to be readily removed and reversed when desired, as, for instance, if the front side, after long exposure to the wind and weather, becomes dirty or the color becomes obscure, in which case the rear side can be used in its turn.

Said stem 1 passes loosely through bearings 8 in the forked end 9 of a round bar 11, which is clamped between a short clamp member 12 and a long clamp member 13. Both of said clamp members have ears 14, the ears of the clamp member 12 having threaded holes into which are screwed screws 16 passing through holes in the ears 14 of the long clamp member. By this means the bar is firmly clamped between said members. As will hereinafter be explained, the long clamp member is secured to the left side of the frame of the windshield of the automobile or the left standard of the windshield in case the windshield consists of a glass frame swinging between the standards. Some windshields are vertical, but others slope rearwardly from the vertical. The above construction, by which the bar 11 can be turned about its axis before being clamped, permits of the stem 1 extending horizontally whatever be the angle at which said member of the frame is disposed to be vertical.

The long clamp member 13 is formed with a transversely extending jaw 17, and there is also provided a companion jaw 18, said jaws being of such form as to grip firmly between them the left side of the frame of the windshield or the left standard thereof. In order to cause said jaws to grip such an element firmly, there are provided screws 19, which extend through holes in the clamp member 13, and are screwed into threaded holes in the jaw 18. When said screws have been screwed up so as to cause said jaws 17, 18, to grip said element very firmly, the jaws are additionally secured thereto by screwing inwardly a set screw 21 screwed through a threaded hole in a portion of the jaw 18 at the outer side of said threaded holes therein and adjacent to the short clamp member 12. The screwing inwardly of said set screw draws the outer end of said jaw 18 away from the clamp member 13, and therefore its inner end, or the jaw proper, inwardly so that the side standard, or side portion of the frame, is very firmly gripped between said jaws without any possibility of becoming detached therefrom by accident.

Secured by a pin 22 driven therethrough and through the stem 1 is a collar 23 surrounding said stem and having four equidistant sockets 24, said pin 22 being driven through the bottom of one of said sockets.

These sockets correspond in position with the positions of the arrow when it points respectively upward, downward, to the right and to the left. Into any one of these sockets is adapted to enter the point of a pin 26 slidable longitudinally in a recess 27 extending longitudinally in the bar 11 and opening between the fork members 9. A coiled spring 28 in said recess 27, compressed between the bottom of said recess and the rear end of said pin, normally presses said pin outwardly, so that its point is adapted to enter the socket 24. The collar is preferably formed on its circumferential surface with a groove 29 midway between the two ends of the collar, which groove receives the pin 26 in the positions of the collar intermediate of those in which the pin can enter the sockets. The main purpose of this groove is to prevent the stem moving longitudinally in its bearings while in said intermediate position, so that it is not necessary that the collar should fit closely between its bearings to prevent such longitudinal movement, or that the inner or opposing surfaces of the fork members should be planed smooth, since the collar does not touch said surfaces.

The device is secured on the left side of the windshield. It is not necessary to likewise secure one on the right side, since from the front it is seen sufficiently well when placed on the left side, whether turned to the right or to the left, so that one signal serves for both sides. It is not necessary to place it on the right side for persons approaching from the rear, since it is forbidden by all State laws for one vehicle to pass another on the right side. Normally, when the vehicle is traveling straight ahead, the arrow points upward. When the driver intends to stop the vehicle he turns the arrow downward by means of the handle, and when he intends to turn to the right or left, as the case may be, he turns the arrow so as to point to the right or the left accordingly. In either of these positions the arrow is held securely by reason of the pin engaging the corresponding socket in the collar.

Many devices direction-pre-indicating have been provided in which a push button or other electric switch is actuated to operate the indicating signal, but such button or switch requires the driver of the vehicle to momentarily look at it to operate it. My invention possesses the advantage that the driver does not have to look at the handle to operate it but he can reach out his left hand and operate it by touch and can tell immediately by the sense of touch whether the arrow is turned through one-quarter of a revolution in either direction or through half a revolution.

It will be observed that the present indicating device can be attached to any automobile without the necessity of boring a hole therein or making any change in the frame of the automobile. Owners of automobiles generally object very strongly to the installation of an indicating signal which necessitates disfiguring or otherwise changing the frame of the automobile, and my invention overcomes this objection.

Again, I have found that automobile owners object to pre-indicating signals which require the use of electric circuits on account of the fact that there is great danger of short circuiting in installation, and thus ruining the batteries. Moreover, many automobiles are not equipped with batteries.

I claim:

A direction pre-indicator comprising a bearing having a bar extending at right angles thereto, a clamp member having a wind shield clamping jaw at one extremity thereof and provided with a recess to receive said bar, apertured ears on the other end of said clamp member, a clamp member secured to said ears for rotatably clamping the bar upon said clamp member, a fastening element extending through said ears and the last-named clamp member, a jaw coöperating with the first-named jaw to secure the first-named clamp member to a wind shield and being independent of the second-named clamp member, a stem rotatably mounted in said bearing, a handle on one end of said stem and a pointer device secured to the other end of the stem and extending at right angles thereto.

EDWARD H. HEBERN.